US010200951B2

(12) United States Patent
Yu et al.

(10) Patent No.: US 10,200,951 B2
(45) Date of Patent: Feb. 5, 2019

(54) LOW POWER LOW LATENCY PROTOCOL FOR DATA EXCHANGE

(71) Applicant: QUALCOMM Incorporated, San Diego, CA (US)

(72) Inventors: Andy I-Fong Yu, San Diego, CA (US); Honghao Liu, Toronto (CA); Andrei Tudorancea, San Diego, CA (US); Zeeshan Asad Sardar, Toronto (CA); Lakshmi Narayana Macha, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 108 days.

(21) Appl. No.: 14/626,539

(22) Filed: Feb. 19, 2015

(65) Prior Publication Data

US 2015/0237580 A1    Aug. 20, 2015

Related U.S. Application Data (60) Provisional application No. 61/948,074, filed on Mar. 5, 2014, provisional application No. 61/942,512, filed on Feb. 20, 2014.

(51) Int. Cl.
*H04W 52/02* (2009.01)
*H04L 12/40* (2006.01)

(52) U.S. Cl.
CPC ... *H04W 52/0229* (2013.01); *H04L 12/40039* (2013.01); *H04W 52/0251* (2013.01);
(Continued)

(58) Field of Classification Search
CPC .................................................. H04W 52/0229
See application file for complete search history.

(56) References Cited

U.S. PATENT DOCUMENTS

| 7,062,303 B2 | 6/2006 | Guterman |
| 8,799,697 B2 | 8/2014 | Johnson et al. |

(Continued)

FOREIGN PATENT DOCUMENTS

| CN | 101091398 A | 12/2007 |
| CN | 102065577 A | 5/2011 |

OTHER PUBLICATIONS

International Search Report and Written Opinion—PCT/US2015/016790—ISA/EPO—dated May 8, 2015.

(Continued)

*Primary Examiner* — Jason E Mattis
(74) *Attorney, Agent, or Firm* — Patterson & Sheridan, L.L.P (57) ABSTRACT

Certain aspects of the present disclosure relate to techniques for processing (e.g., such as tasks for wireless communications and/or multimedia). According to certain aspects, a method for low power low latency data exchange generally includes providing timing information from a first processing entity to a second processing entity indicating when the second processing entity is to next process a message exchange between the first and second entities using a shared memory space, taking action to exit a low power state, based on the timing information, to access the shared memory space to process the message exchange, and entering the low power state after processing the message exchange.

30 Claims, 6 Drawing Sheets

(52) U.S. Cl.
CPC ...... *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/23* (2018.01); *Y02D 70/24* (2018.01)

(56) References Cited

U.S. PATENT DOCUMENTS

| | | |
|---|---|---|
| 2006/0146769 A1 | 7/2006 | Patel et al. |
| 2007/0109987 A1* | 5/2007 | Kohlmann ........ H04W 52/0225 370/318 |
| 2007/0140199 A1 | 6/2007 | Zhao et al. |
| 2009/0154690 A1* | 6/2009 | Wu .................... G10L 15/34 379/386 |
| 2010/0271217 A1* | 10/2010 | Kates ................. G01N 33/0065 340/604 |
| 2011/0183727 A1* | 7/2011 | Kato ................. H04W 52/0293 455/574 |
| 2012/0100895 A1* | 4/2012 | Priyantha .......... H04W 52/0293 455/574 |
| 2013/0337864 A1* | 12/2013 | Narayanan ......... H04W 52/028 455/552.1 |
| 2014/0092799 A1* | 4/2014 | Jain ................... H04W 52/0258 370/311 |
| 2014/0219151 A1* | 8/2014 | Damji ............... H04W 52/0216 370/311 |
| 2014/0281636 A1 | 9/2014 | Wong et al. |
| 2015/0009874 A1* | 1/2015 | Edara ................ H04W 52/0225 370/311 |

OTHER PUBLICATIONS

European Search Report—EP18186076—Search Authority—The Hague—dated Oct. 20, 2018.

* cited by examiner

LOW POWER LOW LATENCY PROTOCOL FOR DATA EXCHANGE

CROSS REFERENCE TO RELATED APPLICATIONS

This application claims priority to U.S. Provisional Patent Application Ser. No. 61/942,512, filed Feb. 20, 2014 and entitled "Low Power Low Latency Protocol for Data Exchange," and U.S. Provisional Patent Application Ser. No. 61/948,074, filed Mar. 5, 2014 and entitled "Low Power Low Latency Protocol for Data Exchange," both of which are assigned to the assignee hereof and both of which are herein incorporated by reference.

BACKGROUND

I. Field

The present disclosure generally relates to wireless communications and, more particularly, to methods of effecting power savings for wireless devices during periodic data exchanges.

II. Background

Wireless communication systems are widely deployed to provide various types of communication content such as voice, data, and so on. These systems may be multiple-access systems capable of supporting communications with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems and Orthogonal Frequency Division Multiple Access (OFDMA) systems.

Devices connected to a wireless communication system may be configured to perform searches for limited service and camp on limited services on an available radio access technology (RAT) to provide for emergency service access. Searching for and camping on limited service may be performed regardless of whether a device is a voice capable or non-voice capable device.

SUMMARY

Certain aspects of the present disclosure provide a method for processing data on a processing entity of a device. The method generally includes providing timing to a second processing entity indicating when the second processing entity is to next process a message exchange between first and second entities using a shared memory space, taking action to exit a low power state, based on the timing information, to access the shared memory space to process the message exchange, and entering the low power state after processing the message exchange.

Certain aspects also provide various apparatuses and computer program products capable of performing the operations described above.

DETAILED DESCRIPTION

According to certain aspects provided herein, methods and apparatus for performing data exchange between data subsystems using a shared memory and a timer are provided. Performing data exchange between data subsystems using a shared memory and a timer may provide for power savings for wireless devices during predictable and/or periodic data exchanges.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below. It should be noted that the descriptions are also applicable to other technologies with different terminologies.

Figure 1:
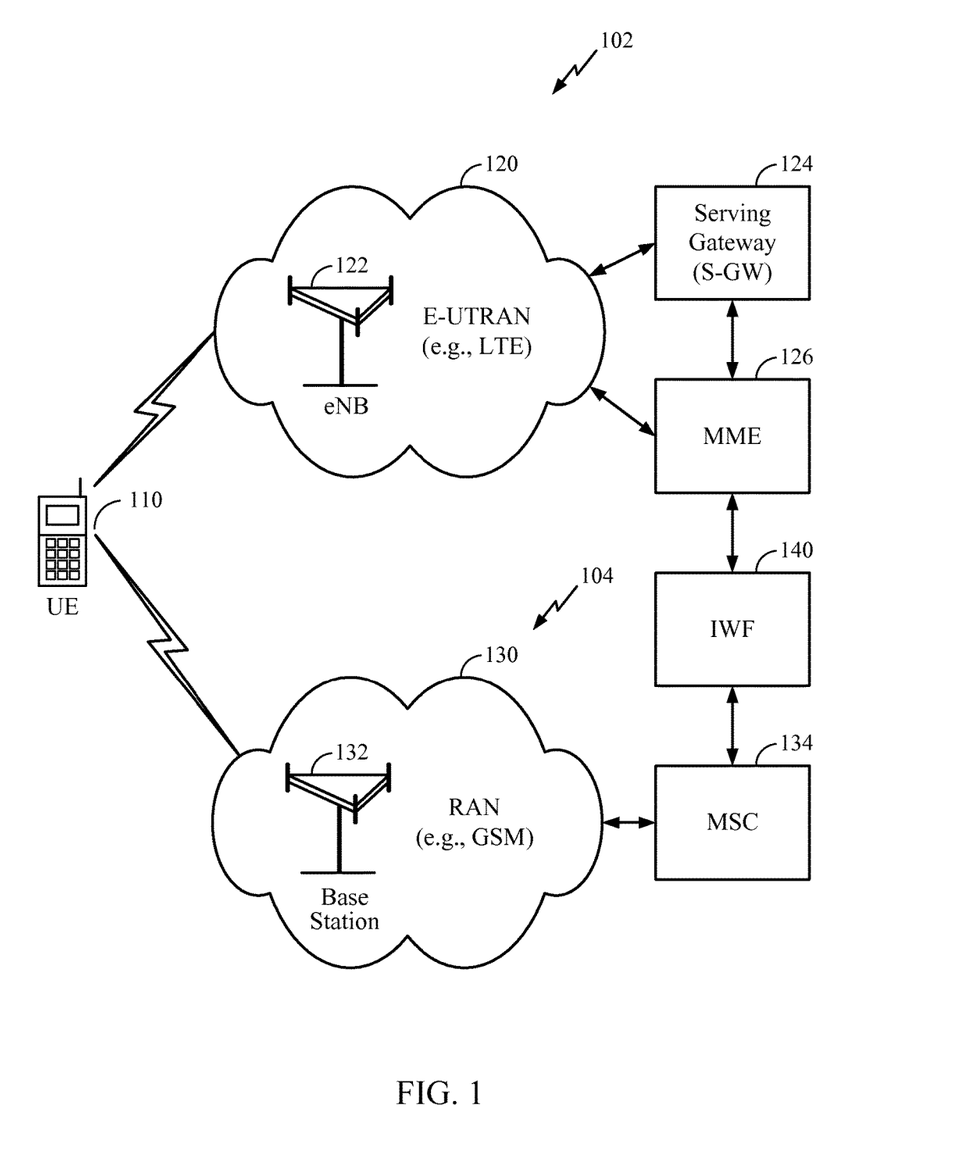
FIG. 1 shows a wireless communication network.

FIG. 1 shows a wireless communication network 100 in which aspects of the present disclosure may be practiced. For example, user equipments (UEs) 110 may use the techniques described herein to save power while performing predictable and/or periodic operations.

As illustrated, wireless communication network 100 includes multiple wireless networks having overlapping coverage. An evolved universal terrestrial radio access network (E-UTRAN) 120 may support LTE and may include a number of evolved Node Bs (eNBs) 122 and other network entities that can support wireless communication for user equipments 110 (UEs). Each eNB 122 may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1xCSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1xRTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
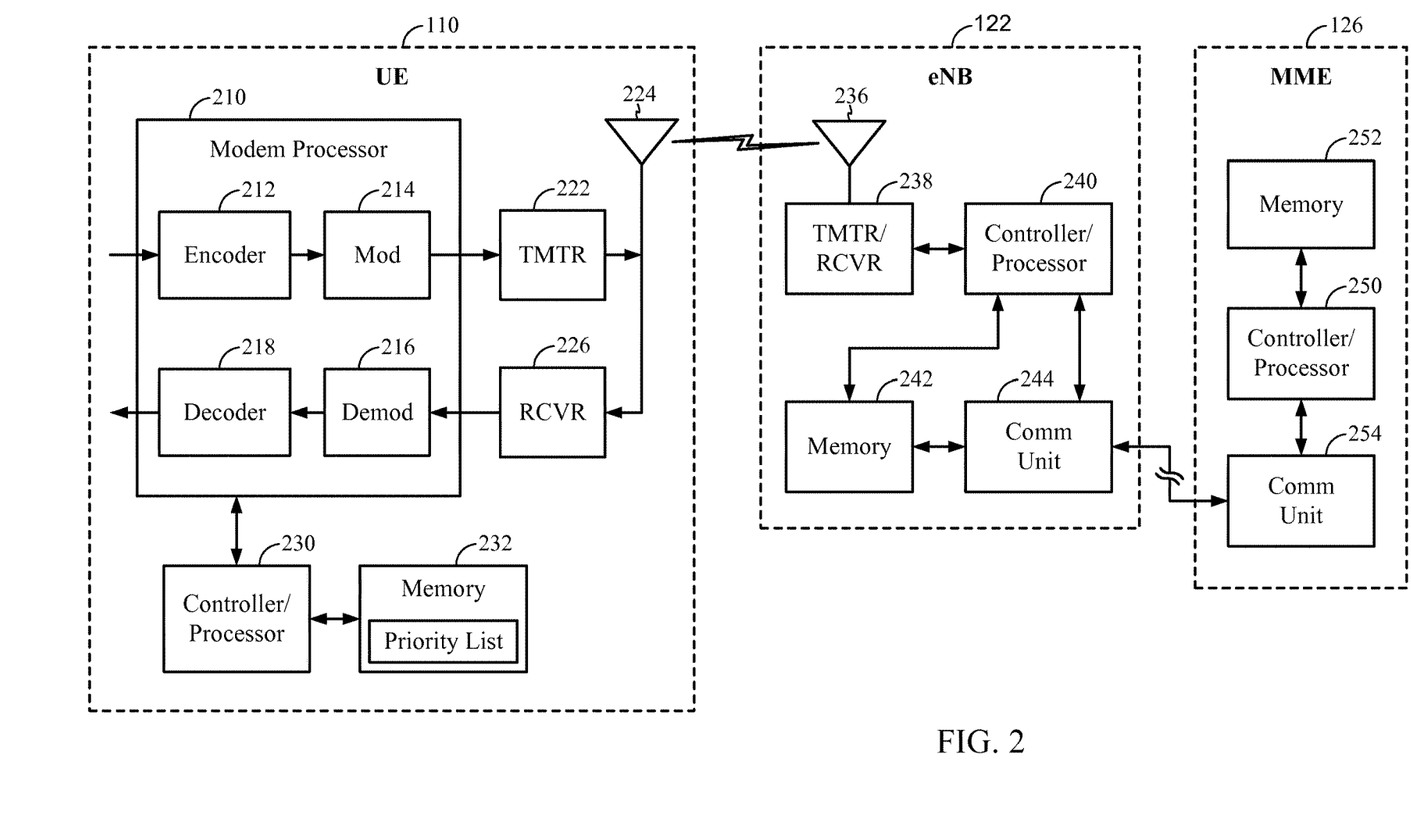
FIG. 2 is a block diagram of a user equipment (UE) and other network entities.

FIG. 2 shows a block diagram of a design of UE 110, eNB 122, and MME 126 in FIG. 1. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1×RTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIG. 3. Memory 232 may store program codes and data for UE 110. Memory 232 may also store a priority list and configuration information.

At eNB 122, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122 in FIG. 3. Memory 242 may store program codes and data for the base station. A communication (Comm) unit 244 may support communication with MME 126 and/or other network entities.

At MME 126, a controller/processor 250 may perform various functions to support communication services for UEs. Memory 252 may store program codes and data for MME 126. A communication unit 254 may support communication with other network entities.

FIG. 2 shows simplified designs of UE 110, eNB 122, and MME 126. In general, each entity may include any number of transmitters, receivers, processors, controllers, memories, communication units, etc. Other network entities may also be implemented in similar manner.

Low Power Low Patency Protocol for Data Exchange

Wireless devices typically can perform data operations that may be predictable and/or periodic, such as Voice over LTE (VoLTE) or Video Telephony over LTE (VTLTE). Operations such as VoLTE or VTLTE may have predetermined packet exchange times that may be used to reduce the number of times an RF device (e.g., a modem) is woken up but keep round-trip delays within reasonable limits. For operations that have predetermined data unit exchange times, power savings may be realized using Connected Mode Discontinuous Reception (CDRX), in which a device turns off a radio and places a modem into a low-power state (e.g., sleep state) for different durations depending on, for example, talk, listen, and silence states. For VoLTE operations, CDRX may also entail switching from a 20 ms packet exchange to a 40 ms packet exchange periodicity to reduce the number of times an RF device is woken up and keep round-trip delays within reasonable limits.

To effect power savings for wireless devices, synchronizing data exchanges between subsystems (for example, modem and voice subsystems in VoLTE or VTLTE) may entail synchronizing data exchanges without one subsystem causing another to wake up at the wrong time, which may negate possible power savings. Additionally, power savings may be realized by reducing software layering delays, improving system jitter handling, reducing interrupt frequencies, improving the accuracy of data synchronization, and allowing for seamless switching between different buffering sizes.

In some real-time systems (e.g., CDMA, GSM, WCDMA, TDS-CDMA, and LTE), there may be periodic windows during which critical operations may need to begin and complete. In other periodic windows, subsystems may be powered down or switched to a low-power state. It may be difficult to determine when operations begin and complete when multiple process may need to occur at different periods. Additionally, general purpose input/output (GPIO) interrupt processing latencies, preemptive scheduling, dynamic processor and bus clock switching, and the number of software layers may impose additional variable delays. Typically, to compensate for these delays, system clock rates may be increased, or delays may be artificially increased to accommodate the worst case headroom acceptable for non-normative system jitters. These compensations may waste power due to the allocation of additional resources for fringe cases.

For some applications, data reception and transmission may be predictable and periodic. These applications include, for example, audio/video transmission, sensors, bus protocols (e.g., high speed inter-chip), or network interface operations (e.g., polling modes). Data may include control or event information as well as user data.

For example, the techniques described herein may be used in inter-process communications (IPC) between the modem processor 210 and controller/processor 230 shown in FIG. 2.

Aspects of the present disclosure may help to save power by synchronizing timing between processing subsystems and activating subsystems when data is expected to be processed. Power savings may be realized, for example, by allowing processing subsystems to independently schedule when to exit a low power state to check a shared memory space for messages to process. The processing subsystems may be in a low power state for as much time as possible.

Dynamic voltage and clock switching may be completely enabled. System clocks need not be maintained at nominal settings to support IPC between subsystems. Further, clock rates need not be increased, for example, to prevent preemption of critical tasks by processing interrupts in an interrupt service routine or interrupt service thread context.

Aspects of the present disclosure may allow for high IPC performance, regardless of system clock rate changes. Message delivery and reception may be processed using the resources of each processing subsystem independently. Subsystems may be operated using the lowest clock rate possible, even under a combination of critical and non-critical IPCs. Processing priority may be governed by the sender or receiver thread's priority.

Aspects of the present disclosure may allow for minimal latency and layering overheads, as processing subsystems may directly read data just before the data is needed. For example, round trip delays for GSM voice calls may be reduced by up to 4.615 ms due to aligning the processing of data to modulation and demodulation times rather than to the beginning of the closest TDMA frame processing timeline.

Message delivery and reception may be highly precise, as work completion may be expected before a specified time. Message delivery and reception may be robust to system jitter as well, as a processing subsystem can be configured to read expired buffers in shared memory spaces while the overall system moves forward in real time.

In some cases, polling-based algorithms may be replaced with time stamp-based algorithms, which may further avoid wasted processing cycles. With a time-stamp-based algorithm, the server can write, to a data buffer (or series of data buffers) a data unit and a timestamp associated with the data unit. During execution, the client-side timer handler periodically wakes the client up to read expired buffers from the transmit buffer. In reading an expired buffer, the client can determine the amount of clock skew that must be compensated for during execution. Based on the amount of clock skew, the client can program its own time to cause buffers for the receiver and transmit sides to perform faster or slower. On the server side, changes in the periodicity at which packets are received and written is captured from the amount of time compensation applied on the client side, and generation of packets can be modified based on the amount of compensation applied on the client side.

Aspects of the present disclosure may reduce the use of interrupts for IPCs. Dedicated interrupt lines need not be implemented. For example, vocoder frame reference (VFR) interrupts between modem and voice subsystems to synchronize network and device clocks may not be needed, as the modem and voice subsystems can compute clock drift errors and request clock correction to catch up to the time in the pulse code modulation (PCM) domain. Hardware designs may eliminate dedicated VFR interrupts and allow for simpler modem-voice hardware (e.g., multiple SIM, multiple active modems) designs. Synchronization of high-resolution time references between processing subsystems may be performed without using interrupts in a steady state. Reducing the use of interrupts may provide support for IPC in both kernel-space and user-space contexts.

Aspects of the present disclosure may allow for dynamic changes to buffering granularity. For example, in VoLTE operations, switching between 20 ms and 40 ms modes can be performed seamlessly. The voice subsystem need not be stopped for reconfiguration, which may reduce the frequency and length of audio gaps during VoLTE operations.

Polling-based algorithms may be replaced with time stamp-based algorithms, which may further avoid wasted processing cycles.

The operations described herein may be fully asynchronous and allow for the emulation of isochronous-like operations.

Time synchronization between processing subsystems may provide for accurate audio/video synchronization.

Figure 3:
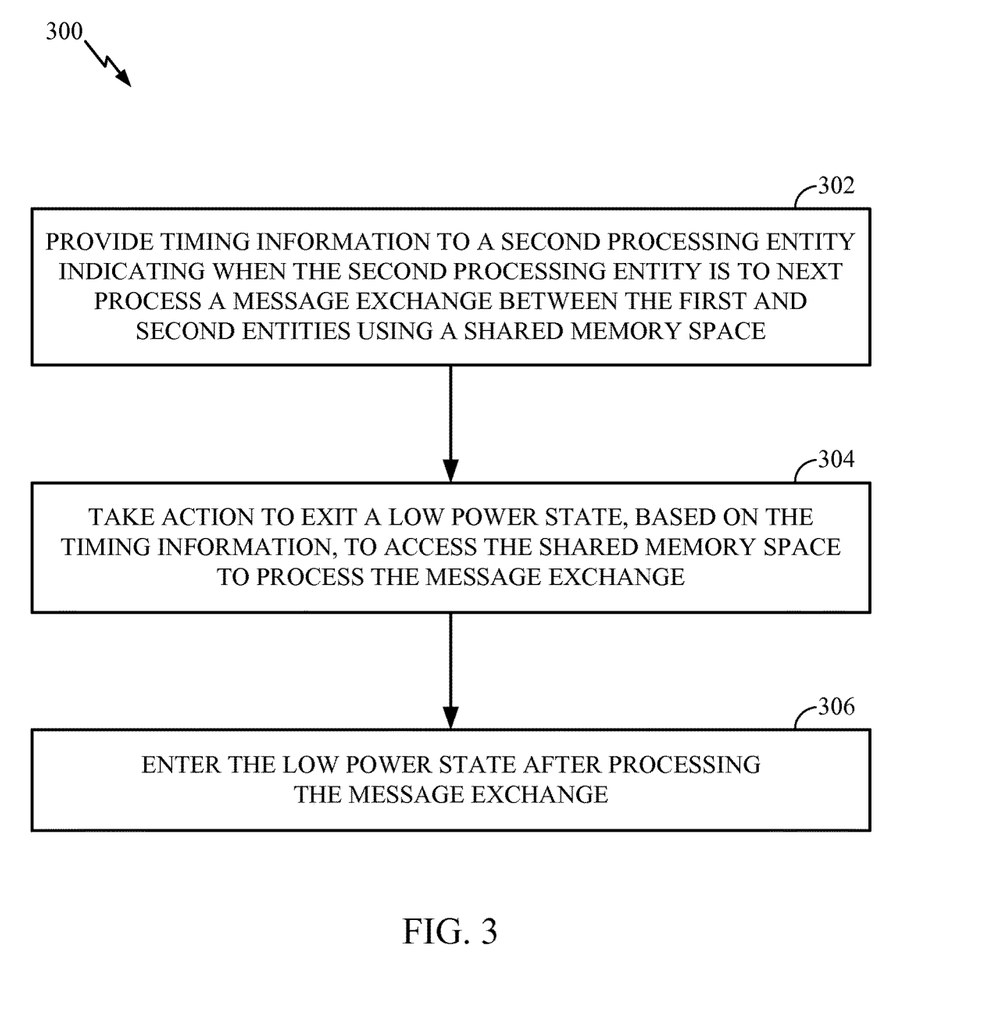
FIG. 3 illustrates example operations that may be performed by a processing entity of a device to facilitate low power, low latency data exchange, according to certain aspects of the present disclosure.

FIG. 3 illustrates example operations that may be performed by a first processing entity of a wireless device to implement a low power, low latency protocol for predictable and/or periodic data exchange. As shown, operations 300 begin at 302, where the first processing entity provides timing information to a second processing entity indicating when the second processing entity is to next process a message exchange between the first and second processing entities using a shared memory space. At 304, the first processing entity takes action to exit a low power state, based on the timing information, to access the shared memory space to process the message exchange. At 306, the first processing entity enters the low power state after processing the message exchange.

The first processing entity and second processing entity may be configured to independently receive, process, and send messages, and the first and second processing entities may be configured to enter a low power mode independently.

In some aspects, the timing information may be provided via a shared memory space. A shared memory space may entail, for example, shared memory or interfaces that act like shared memory (e.g., a low latency interface).

Taking action to exit a low power state may comprise programming a timer local to a processing entity. In some aspects, this timer may be configured to cause a processing entity to exit a low power state just before data is scheduled to be processed. Timers local to a processing entity may be standard timers and need not be implemented using specialized hardware. Each processing entity (e.g., the first and second processing entities) may have its own timer, and each timer may be programmed to cause the processing entities to independently wake up and read messages from or write messages to a shared memory space at an appropriate time.

In an aspect, the first processing entity may comprise a modem subsystem and the second processing entity may comprise a voice subsystem. The modem and voice subsystems may adjust the timing information to switch between different rates of packet exchanges between the subsystems. For example, the different rates may correspond to 20 ms and 40 ms VoLTE packet exchange modes. For transmitting voice data, timing information may be designed to ensure that the voice processing system provides vocoder packets or pulse code modulation (PCM) samples to the shared memory space prior to the first processing entity exiting the low power state, and taking action to exit the low power state may comprise taking action to ensure the first processing entity exits the low power state in time to process the vocoder packets or PCM samples for transmission. For receiving voice data, taking action to exit the low power state may comprise taking action to ensure the first processing entity exits the low power state in time to demodulate received signals, and the timing information may be designed to ensure that the voice processing system exits a low power state to process the demodulated received signals.

The first and second processing entities may reside on a same integrated circuit, different integrated circuits, or as part of a common processor. In some aspects, the first and second processing entities may be connected via a bus, such as a serial bus.

The first processing system may be considered a client system and the second processing system may be considered a server system, as the first processing system may be configured to generate or receive data and provide that data to the second processing system. The first processing system may comprise, for example, a modem or a data provider (e.g., a camera, microphone, etc.), and the corresponding second processing system may comprise, for example, a voice processing system or a playback device, respectively. The roles of the first and second processing systems may be reversed, for example, depending on whether the system, as a whole, is receiving or transmitting data.

Figure 4:
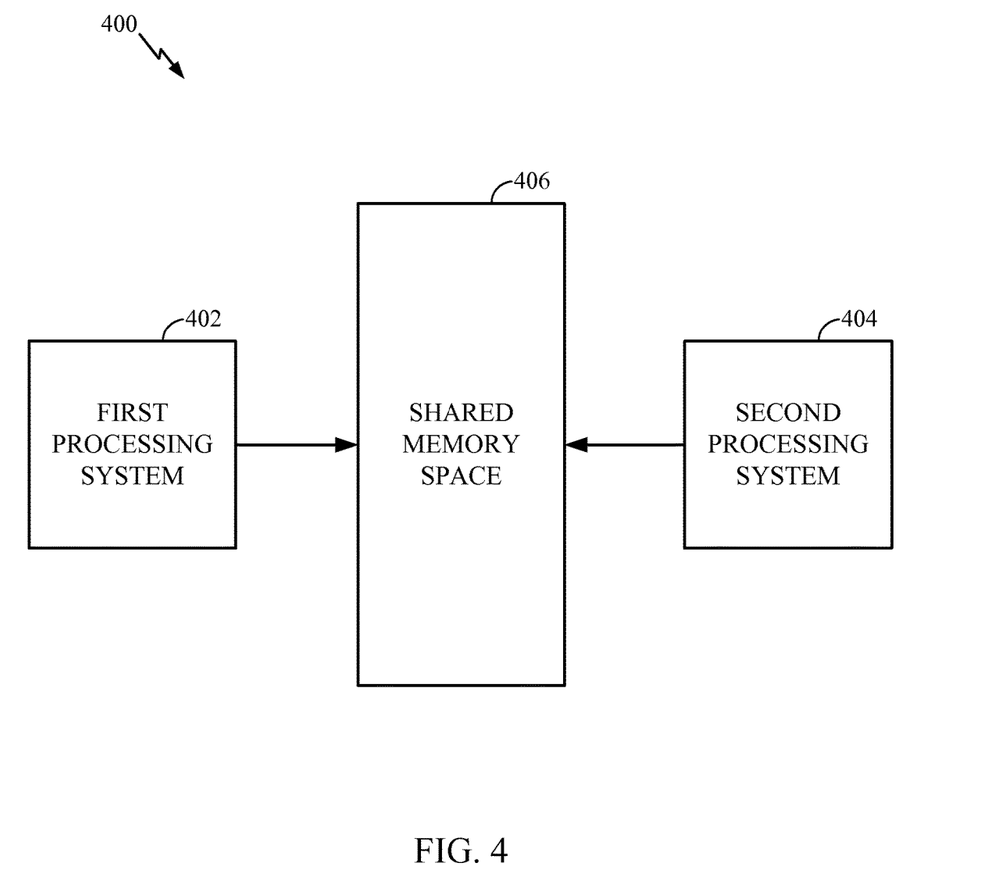
FIG. 4 illustrates a block diagram of an example system for low power, low latency data exchange, according to certain aspects of the present disclosure.

FIG. 4 is a block diagram of an example system 400 for low power, low latency data exchange. System 400 may operate according to the operations described in FIG. 3. The system 400 may have a first processing system 402, a second processing system 404, and a shared memory space 406. Per FIG. 3, first processing system 402 may provide timing information to second processing system 404 indicating when second processing system 404 is to next process a message exchange between first processing system 402 and second processing system 404 using shared memory space 406. When exiting a low power state based on the timing information, first processing system 402 may write data to shared memory space 406 just before second processing system 404 reads data from shared memory space 406. After writing data to shared memory space 406, first processing system 402 may enter the low power state.

Figure 5:
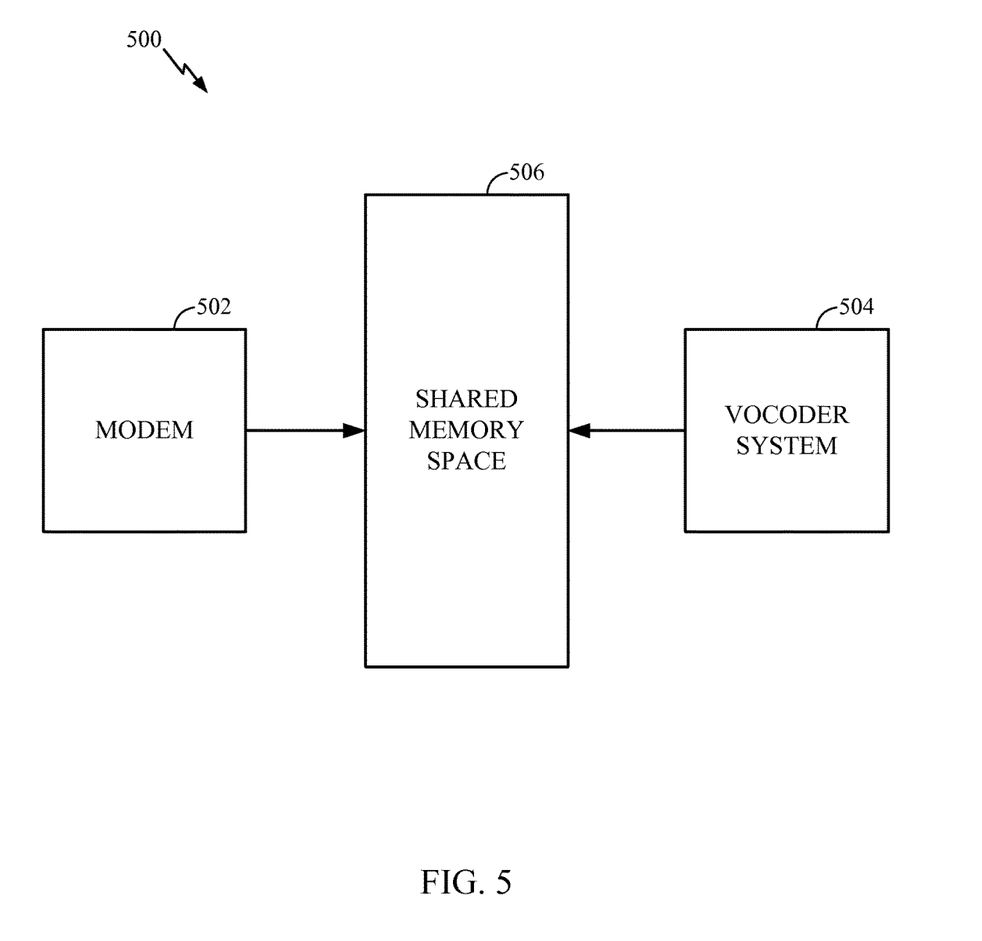
FIG. 5 illustrates a block diagram of an example system for low power, low latency data exchange in a voice data context (e.g., VoLTE), according to certain aspects of the present disclosure.

FIG. 5 illustrates a block diagram of an example system 500 for low power, low latency data exchange in the voice data (e.g., VoLTE) context. The first processing system 402 described in FIG. 4 may comprise modem 502, and the second processing system 404 described in FIG. 4 may comprise vocoder system 504. When a device is transmitting voice data, modem 502 may read vocoder packets, PCM samples, and the like from shared memory space 406, modulate the packet, and transmit the modulated packet to another device, and vocoder system 504 may write vocoder packets or PCM samples to shared memory space 406. When a device is receiving voice data, modem 502 may demodulate received packets and write the demodulated packets to shared memory space 406, and vocoder system 504 may read data from shared memory space 406.

Aspects of the present disclosure may also be used for low power, low latency data exchange in the video or graphics contexts. For example, in a VTLTE communication, sound and video can be captured from capture devices (e.g., a webcam and a microphone) and processed at a first processing system for transmission to a second processing system. While a video telephony call is being performed, capture and processing of data by the first processing system may continue on a regular basis. For example, data exchange may be scheduled every n frames of video, where n is a positive number.

For exchanging graphics data (e.g., from a video game or video decoding operation), the first processing system can generate packets to be used in providing multimedia or entertainment content to a user. As with video telephony applications, multimedia or entertainment content may be exchanged on a frame-by-frame basis. In some cases, the periodicity of data exchange may be calculated to provide for smooth playback of graphics and sound. In some cases, the periodicity of data exchange may be calculated based on the format of the data to be exchanged (e.g., video frames encoded at 1080p/24 fps may be exchanged with a different periodicity than video frames encoded at 1080p/60 fps).

Figure 6:
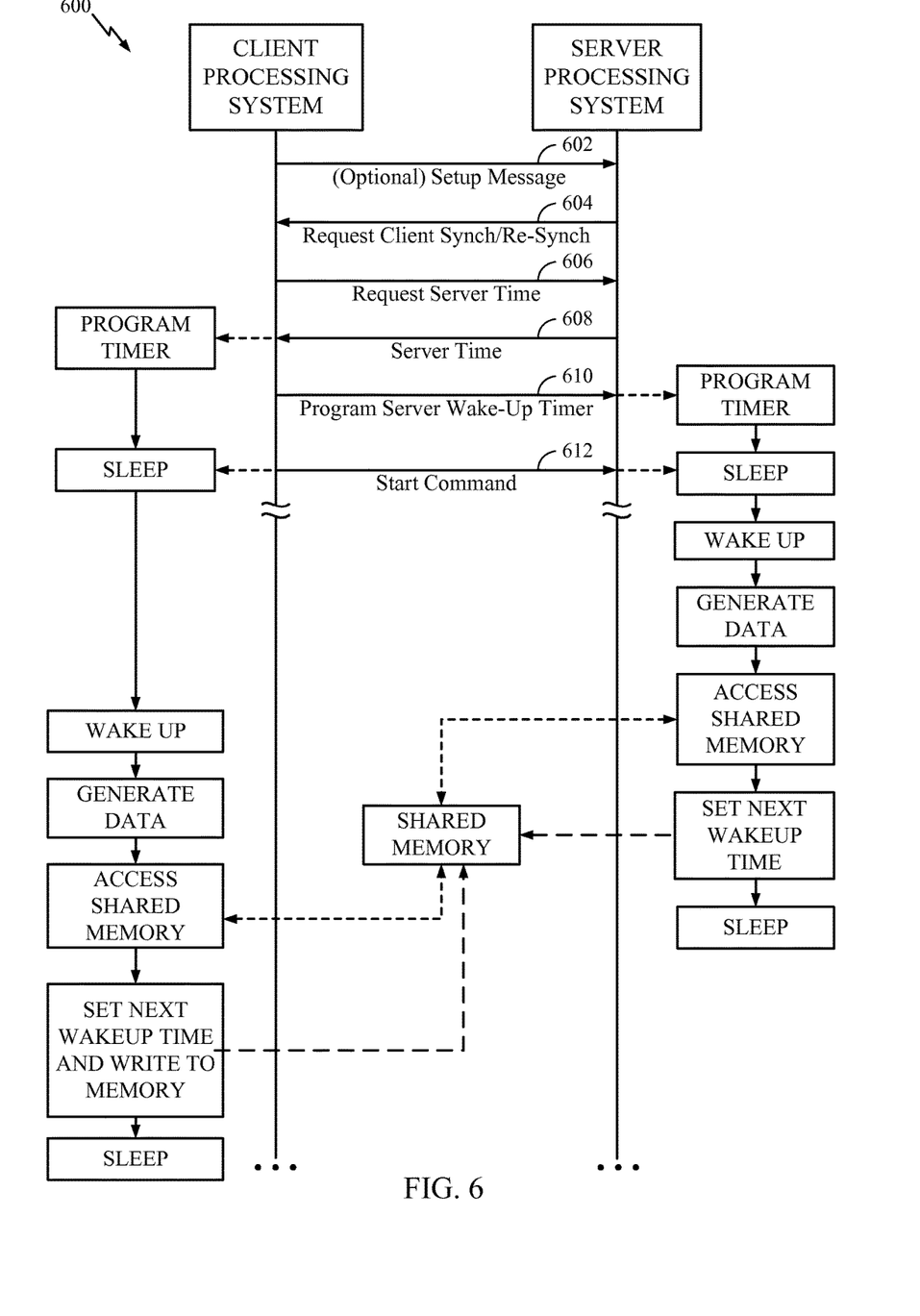
FIG. 6 illustrates an example message flow diagram showing messages exchanged between client and server subsystems during initialization and steady-state operations, according to certain aspects of the present disclosure.

FIG. 6 illustrates a message flow diagram 600 illustrating messages that may be exchanged between a first and a second processing entity for low power, low latency data exchange according to aspects of the present disclosure. In some aspects, the first processing subsystem may be a server, and the second processing subsystem may be a client. Operations utilizing the methods described herein may be broadly described in terms of an initialization stage, steady-state operations stage, and termination stage.

In the initialization stage, a first processing subsystem and second processing subsystem may synchronize clocks and provide buffers for use on the transmit and receive paths. The client system transmits an optional setup message 602 to the server system. In setting up communications between a client and a server, a clock associated with the client may be synchronized with a clock associated with the server. To synchronize clocks at the client and server, the server may transmit a synchronization request message 604 requesting the client to synchronize a clock associated with the client with a clock associated with the server. The client may then transmit a server time request message 606 requesting the server's time and receive the server's time via message 608. Based on the received server time, the client programs its own clock and timer and transmits a message 610 instructing the server to program the server's timer. In some cases, (e.g., if the server detects an uncorrected time skew between the client and the server exceeding a maximum jitter tolerance), the server may autonomously transmit a request 604 to the client to re-synchronize with the server (e.g., rather than waiting for a setup message 602).

In either case, after synchronizing the client and server clocks and programming timers associated with the client and server, the client can transmit start command 612 to begin steady-state operations (e.g., the generation of messages written to shared memory by the server system, and the reading of messages stored in shared memory by the client system, as discussed herein).

After the client and server systems have synchronized clocks and programmed their respective timers, the client and server systems can enter a low power (sleep) state. The server system may wake up when the server timer expires to generate data and access the shared memory. In accessing the shared memory, the server system may write the generated data to shared memory and read any data that a client system may have previously written to the shared memory. After accessing the shared memory and setting the server system's next wake up time (in some cases, based on information stored in shared memory), the server system can re-enter a low power (sleep) state until the next time the server timer expires. Meanwhile, the client system may wake up when the client timer expires (at a time at which the client system may expect data to be present in shared memory) and read the contents of the shared memory. In some cases, the client system may also generate data to be written to shared memory. The client system may access the shared memory to read data written to shared memory by the server system and, if applicable, write generated data to shared memory. After accessing the shared memory, the client system can set the next wakeup time, write the client system's next wakeup time to shared memory, and enter a low power (sleep) state until the client timer reaches the next wakeup time. In this manner, the server and client devices may be active and draw power when data is to be written to or read from shared memory and inactive when the server and client devices are waiting to write to or read from shared memory, thus lowering power usage.

During the initialization stage, the client and server systems may provide buffers to be used during steady-state operations. In some cases, the buffers may be first-in, first-out structures, where the earliest packet of data written to a buffer is the first packet removed and read from the buffer. The client can provide the transmit side with one or more empty buffers for the server to store data, and the server can provide one or more buffers on the receive side for data to be processed by the client. On the transmit side, buffers may be provided to support a set transmission period, and additional buffers may be provided to provide additional time for the client to process data before freeing a buffer to receive data from the server. The server may store a timestamp indicating when data is provided to a buffer. On the receive side, the client can mark data with timestamps set in the future and can mark empty buffers to signify that the server should perform, for example, error concealment or silence. The client and server may program their respective local timers to wake up and deliver data just in time before the other subsystem needs to read the buffer. Waking up and delivering data just in time may be supported due to a client programming data exchange timestamps on each buffer and the use of absolute time to program both the client and server timers, which allows for accurate timing and corrections to be performed on each cycle to avoid accumulated time drift.

For example, in VoLTE CDRX operations, the client (for example, a modem) may supply three buffers for a server (for example, a voice subsystem) to store encoded vocoder packets. Two buffers, each of a 20 ms duration, may be used to buffer data for the 40 ms vocoder packet exchange period. An optional additional 20 ms buffer may be used to provide an additional 20 ms for the client to process data before freeing a buffer back to the server for encoding.

During steady-state operations, the client and server can continually read and write to the receive and transmit side buffers, respectively. The client-side timer can cause the client to periodically wake up to read expired transmit side buffers and supply empty buffers to the server. The client-side timer may also cause the client to periodically wake up to write data to the receive side buffers for the server to decode. The server-side timer can cause the server to periodically wake up to write encoded data into the transmit buffers before the buffers expire and may cause the server to read data from the receive side buffers at the expiry to decode received data.

The client may be given control to correct timing drift between the network time and device time. Drift may be caused due to the network time and device time being generated from different clock crystals, which may eventually cause the network time and device time to drift. The client may read the capture time from expired transmit-side buffers to detect average clock drift between the client clock and server clock. The client can return the data exchange between the client and server to the original timeline by programming buffer expirations to be earlier or later. The server can detect changes to periodicity and change the data rate to match the amount of time compensation that may be needed to correct for timing drift.

For example, in VoLTE operations, the voice subsystem can provide encoded data to a modem in the transmit side buffers, and a modem can provide data to the voice subsystem for decoding in the receive side buffers. In correcting for timing drift, the voice subsystem can employ sample slipping and stuffing algorithms over longer durations of time to mask or conceal the effects of time correction to the user.

For multimedia playback and recording operations, data exchanged between the client and server can include audio, encoded using various codecs, and video frames, which may or may not be encoded. Multimedia playback and recording can include audio and video playback, recording, or transcoding, as well as camera or camcorder recording. Playback may comprise a client subsystem writing encoded data to the receive side buffers, which may decode the encoded data and output the decoded data to one or more output devices. Recording may comprise a client subsystem writing data into the transmission side buffers. Transcoding operations may entail use of both receive side and transmission side buffers. Data to be transcoded may be placed into the receive side buffers, and transcoded data may be read from the transmission side buffers.

For sensor data recording, power savings and reduced system latency may be realized by avoiding the use of interrupts that wake up an application processor unnecessarily during steady state operations for applications that favor precise data capture timestamps over when the data was actually received. Sensor data may be recorded from, for example, gyroscopes, global navigation satellite system (e.g., GPS, GLONASS, GALILEO, etc.) devices, magnetic sensors, and the like. Sensor data can be recorded to the transmit side buffers, and a client can read recorded data from the transmit side buffers. The client may read recorded data at any time and may be forced to read recorded data when the transmit side buffers become full. When the transmit side buffers are full, the server can interrupt the client to cause the client to re-sync; after the client re-syncs, interrupt-less steady state operations may proceed. Increased amounts of memory may allow a server to capture more data before the client is interrupted to read and empty a full buffer. Buffering sensor data may allow application processors to read sensor data whenever the application processors desire to instead of being forced to read at certain intervals, which may prevent or delay the execution of system critical tasks.

During the termination stage, the client can flush out any data remaining in the transmit side and receive side buffers. The client and server devices may subsequently be placed in a low-power mode (e.g., a sleep state) until operations involving the client and server devices are initiated again (e.g., the device is used for a new VoLTE or VTLTE call).

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or any combination of any number of A, B, or C.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for processing by a first processing entity of a device, comprising:
    providing timing information to a second processing entity indicating when the second processing entity is to next process a message exchange between the first and second processing entities using a shared memory space, wherein processing the message exchange comprises reading messages from the shared memory space or writing messages to the shared memory space;
    taking action to exit a low power state, based on the timing information, to access the shared memory space to process the message exchange, wherein taking action to exit the low power state comprises setting a timer to cause the first processing entity to wake up prior to a time identified in the provided timing information; and
    entering the low power state after processing the message exchange.

2. The method of claim 1, wherein:
    the device comprises a wireless device; and
    the first and second processing entities are configured to process tasks related to wireless communications.

3. The method of claim 1, wherein the first and second processing entities are configured to process tasks related to multimedia processing.

4. The method of claim 3, wherein the message exchange is related to at least one of audio codecs, video frames, or graphics data.

5. The method of claim 1, wherein the first and second processing entities are configured to process tasks related to processing sensor data.

6. The method of claim 1, wherein the timing information is provided via the shared memory space.

7. The method of claim 1, wherein the shared memory space comprises at least one of a shared physical memory or a low latency interface (LLI).

8. The method of claim 1, wherein taking action to exit a low power state comprises programming a timer local to at least one of the first or second processing entities.

9. The method of claim 1, wherein the first processing entity comprises a modem subsystem and the second processing entity comprises a voice subsystem.

10. The method of claim 9, further comprising adjusting the timing information to switch between different rates of packet exchanges between the modem and voice subsystems.

11. The method of claim 10, wherein the different rates correspond to durations for packet exchange used for voice over long term evolution (VoLTE) or video telephony over long term evolution (VTLTE) communications.

12. The method of claim 9, wherein:
    the timing information is designed to ensure the voice subsystem provides vocoder packet samples to the shared memory space prior to the modem exiting the low power state; and
    taking action to exit the low power state comprises taking action to ensure the modem exits the low power state in time to process the vocoder packet samples.

13. The method of claim 9, wherein:
    taking action to exit the low power state comprises taking action to ensure the modem exits the low power state in time to demodulate received signals; and
    the timing information is designed to ensure the voice subsystem exits a low power state to process the demodulated received signals.

14. The method of claim 1, wherein the first and second processing entities reside on a same integrated circuit.

15. The method of claim 1, wherein the first and second processing entities are part of a common processor.

16. The method of claim 1, wherein the first and second processing entities are connected via a serial bus.

17. An apparatus, comprising:
    a first processing entity configured to:
        provide timing information to a second processing entity indicating when the second processing entity is to next process a message exchange between the first and second processing entities using a shared memory space, wherein processing the message exchange comprises reading messages from the shared memory space or writing messages to the shared memory space;
        take action to exit a low power state, based on the timing information, to access the shared memory space to process the message exchange, wherein taking action to exit the low power state comprises setting a timer to cause the first processing entity to wake up prior to a time identified in the provided timing information; and
        enter a low power state after processing the message exchange;
    the second processing entity; and
    a shared memory.

18. The apparatus of claim 17, wherein:
    the apparatus comprises a wireless device; and
    the first and second processing entities are configured to process tasks related to wireless communications.

19. The apparatus of claim 17, wherein the timing information is provided via the shared memory space.

20. The apparatus of claim 17, wherein the first processing system is configured to take action to exit a low power state by programming a timer local to at least one of the first or second processing entities.

21. The apparatus of claim 17, wherein the first processing entity comprises a modem subsystem and the second processing entity comprises a voice subsystem.

22. The apparatus of claim 21, wherein the first processing entity is further configured to adjust the timing information to switch between different rates of packet exchanges between the modem and voice subsystems.

23. The apparatus of claim 22, wherein the different rates correspond to durations for packet exchange used for voice over long term evolution (VoLTE) or video telephony over long term evolution (VTLTE) communications.

24. The apparatus of claim 21, wherein:
the timing information is designed to ensure the voice subsystem provides vocoder packet samples to the shared memory space prior to the modem exiting the low power state; and
the first processing system is configured to take action to exit the low power state by taking action to ensure the modem exits the low power state in time to process the vocoder packet samples.

25. The apparatus of claim 21, wherein:
the first processing system is configured to take action to exit the low power state by taking action to ensure the modem exits the low power state in time to demodulate received signals; and
the timing information is designed to ensure the voice subsystem exits a low power state to process the demodulated received signals.

26. The apparatus of claim 17, wherein the first and second processing entities reside on a same integrated circuit.

27. The apparatus of claim 17, wherein the first and second processing entities are part of a common processor.

28. The apparatus of claim 17, wherein the first and second processing entities are connected via a serial bus.

29. An apparatus for processing by a first processing entity of a device, comprising:
means for providing timing information to a second processing entity indicating when the second processing entity is to next process a message exchange between the first and second processing entities using a shared memory space, wherein processing the message exchange comprises reading messages from the shared memory space or writing messages to the shared memory space;
means for taking action to exit a low power state, based on the timing information, to access the shared memory space to process the message exchange, wherein the means for taking action to exit the low power state comprises means for setting a timer to cause the first processing entity to wake up prior to a time identified in the provided timing information; and
means for entering the low power state after processing the message exchange.

30. A non-transitory computer-readable medium storing computer executable code for processing by a first processing entity of a device, comprising:
code for providing timing information to a second processing entity indicating when the second processing entity is to next process a message exchange between the first and second processing entities using a shared memory space, wherein processing the message exchange comprises reading messages from the shared memory space or writing messages to the shared memory space;
code for taking action to exit a low power state, based on the timing information, to access the shared memory space to process the message exchange, wherein taking action to exit the low power state comprises setting a timer to cause the first processing entity to wake up prior to a time identified in the provided timing information; and
code for entering the low power state after processing the message exchange.

* * * * *